US012744155B2

(12) United States Patent
Li et al.

(10) Patent No.: US 12,744,155 B2
(45) Date of Patent: Sep. 22, 2026

(54) COMPENSATION STRUCTURE FOR REDUCING CIRCULATING CURRENT IN WINDOW OF TRANSFORMER AND TRANSFORMER COMPRISING COMPENSATION STRUCTURE

(71) Applicant: Siemens Energy Global GmbH & Co. KG, Munich (DE)

(72) Inventors: Lin Da Li, Guangzhou City (CN); Egon Kirchenmayer, Nuremberg (DE); Zhu Sheng Chi, Jinan City (CN); Hong Liu, Guangzhou City (CN)

(73) Assignee: Siemens Energy Global GmbH & Co. KG, Munich (DE)

( * ) Notice: Subject to any disclaimer, the term of this patent is extended or adjusted under 35 U.S.C. 154(b) by 837 days.

(21) Appl. No.: 18/030,848

(22) PCT Filed: Oct. 26, 2020

(86) PCT No.: PCT/CN2020/123607
§ 371 (c)(1),
(2) Date: Apr. 7, 2023

(87) PCT Pub. No.: WO2022/087775
PCT Pub. Date: May 5, 2022

(65) Prior Publication Data
US 2023/0386737 A1 Nov. 30, 2023

(51) Int. Cl.
*H01F 27/28* (2006.01)
*H01F 27/26* (2006.01)
*H01F 27/30* (2006.01)
*H01F 27/38* (2006.01)

(52) U.S. Cl.
CPC .......... *H01F 27/38* (2013.01); *H01F 27/266* (2013.01); *H01F 27/306* (2013.01)

(58) Field of Classification Search
CPC ...... H01F 27/38; H01F 27/266; H01F 27/306; H01F 30/06; H01F 27/34
(Continued)

(56) References Cited

U.S. PATENT DOCUMENTS 7,830,233 B2 11/2010 Hrkac
2011/0309902 A1* 12/2011 Bonin .................. H01F 27/306 336/57
(Continued)

FOREIGN PATENT DOCUMENTS

CN 101091228 A 12/2007
CN 201397727 Y 2/2010
(Continued)

OTHER PUBLICATIONS

International Search Report and Written Opinion of the International Searching Authority mailed Jul. 26, 2021 corresponding to PCT Application No. PCT/CN2020/123607 filed Oct. 26, 2020.

*Primary Examiner* — Shawki S Ismail
*Assistant Examiner* — Kazi S Hossain
(74) *Attorney, Agent, or Firm* — Wolter Van Dyke Davis, PLLC

(57) ABSTRACT

A compensation structure for reducing circulating current in a window of a transformer, the transformer having a winding, a metal frame and leads located at one side of the frame and spaced apart from the frame. The frame has borders and an iron core located inside a window enclosed by the borders. The winding is provided around the iron core, wherein the compensation structure includes at least one compensator on the borders of the frame. The compensator is made of silicon steel sheets of a magnetic material, and the compensator separates at least a part of the borders of the frame from a part of the leads. The compensation structure separates iron structures between a high-voltage side and a low-voltage side, increases the impedance between the win-
(Continued)

dow circuit of the frame and the current circuit of external leads, thereby reducing the induced current within the frame and avoiding harmful effects.

8 Claims, 9 Drawing Sheets

(58) Field of Classification Search
USPC .......................................... 336/192, 5, 55–60
See application file for complete search history.

(56) References Cited

U.S. PATENT DOCUMENTS

2013/0009737 A1* 1/2013 Rocke ..................... H01F 29/14
336/5
2013/0106547 A1* 5/2013 Takahashi ............... H01F 27/08
336/60
2015/0348693 A1 12/2015 Takahashi
2018/0114632 A1* 4/2018 Hwang ................. H01F 27/306
2019/0066902 A1* 2/2019 Taméz Torres ....... H01F 27/402

FOREIGN PATENT DOCUMENTS

| | | | | |
|---|---|---|---|---|
| CN | 201562537 | U | 8/2010 | |
| CN | 102364637 | A | 2/2012 | |
| CN | 103680855 | A | 3/2014 | |
| CN | 103827995 | A | 5/2014 | |
| CN | 110571016 | A | * 12/2019 | ........... H01F 27/263 |
| EP | 2560174 | A1 | 2/2013 | |
| JP | H09289125 | A | 11/1997 | |

* cited by examiner

COMPENSATION STRUCTURE FOR REDUCING CIRCULATING CURRENT IN WINDOW OF TRANSFORMER AND TRANSFORMER COMPRISING COMPENSATION STRUCTURE

CROSS REFERENCE TO RELATED APPLICATIONS

This application is the US National Stage of International Application No. PCT/CN2020/123607 filed 26 Oct. 2020, and claims the benefit thereof, and is incorporated by reference herein in its entirety.

TECHNICAL FIELD

The present invention relates to the field of transformers, and more particularly, to a compensation structure for reducing circulating current in a window of a transformer and a transformer comprising the compensation structure.

BACKGROUND

In some transformers, an axial component of the current of a winding and a lead current thereof can be equivalent to a current circuit parallel to an iron core window. A magnetic field of the current circuit will induce a circulating current on a metal structural member of the iron core window. On the one hand, the circulating current causes additional losses on the metal structural member; on the other hand, the circulating current will generate hot spots on connection parts of the metal structural member, thereby causing gas generation problems and generating quality issues.

So far, common solutions for solving such problems include:

1. A copper compensation ring is provided on the surface of a metal frame, and by using the high conductivity of copper and a reliable connection, the copper compensation ring becomes a main path of an induced circulating current, and produces a shielding effect on other metal components; however, such solution of a copper compensation ring causes large losses on the copper ring, and needs to occupy a part of space of the iron core, having a high overall cost.
2. Bypass cables or short-circuit copper bars are added in a window structure of a frame, and such structure is used to enable some connection points, on which a failure easily occurs, to be short-circuited; however, such solution cannot be applied to all circulating current nodes, and therefore cannot assure 100% to solve the problems.
3. The metal structural member is designed to have a full insulation structure; however, the full insulation structure solution is only applicable to the cases that there is a low induced voltage in the window, otherwise the circulating current may flow into the iron core and may generate other risks.
4. A large-current lead winding (such as voltage regulation and low voltage) is designed to have even-numbered layers, to avoid the occurrence of an equivalent current circuit; however, in some cases, such solution requires to increase material costs of the solution greatly in order to meet parameters of customer requirements.
5. A special lead design is used to enable the leakage flux effects to be mutually compensated by means of leads of different core windings; however, such solution requires a corresponding special design of structures such as oil tank shielding.

SUMMARY

In order to solve the described problems, the object of the present invention is to provide a compensation structure for reducing circulating current in a window of a transformer and a transformer comprising the compensation structure, to separate iron structures between a high-voltage side and a low-voltage side, increase the impedance between the window circuit of a frame and the current circuit of external leads, thereby greatly reducing an induced current within the frame and avoiding harmful effects.

According to one aspect of the present invention, a compensation structure for reducing circulating current in a window of a transformer is provided, the transformer comprises a winding, a metal frame and leads located on one side of the frame and spaced apart from the frame, the frame comprising borders and an iron core located inside a window enclosed by the borders, and the winding being provided around the iron core, in particular, the compensation structure comprises at least one compensator provided on the borders of the frame, the at least one compensator is made of silicon steel sheets of a magnetic material, and the at least one compensator separates at least a part of the border parts of the frame from a part of the leads.

In this way, the at least one compensator made of silicon steel sheets of a magnetic material can separate iron structures between a high-voltage side and a low-voltage side, thereby increasing the impedance between the window circuit of the frame and the current circuit of external leads.

In an exemplary embodiment, the borders of the frame include two transverse borders and two longitudinal borders, and the at least one compensator comprises: two transverse compensators, one at either of the two transverse borders; and/or two longitudinal compensators, one at either of the two longitudinal borders.

In this way, the two transverse compensators and/or the two longitudinal compensators can separate, at suitable positions of the transformer, iron structures between a high-voltage side and a low-voltage side, which further effectively increases the impedance between the window circuit of the frame and the current circuit of external leads.

In an exemplary embodiment, the two transverse compensators are provided symmetrically relative to a longitudinal central axis of the frame, and/or the two longitudinal compensators are provided symmetrically relative to a transverse central axis of the frame.

In this way, the two transverse compensators and/or the two longitudinal compensators are provided symmetrically, which can effectively reduce the circulating current of the whole window (comprising the iron cores of the frame and border iron members of the frame), and can prevent the circulating current from being transferred.

In an exemplary embodiment, the at least one compensator comprises the two longitudinal compensators, wherein the two longitudinal borders are two side limbs each provided at either side of the iron core, and the two longitudinal compensators are each provided around a respective side limb along at least a length of the respective side limb.

In this way, there is a large mounting space on the two side limbs, facilitating the mounting of the longitudinal compensators, and the impedance between the window circuit of the frame and the current circuit of external leads can be effectively increased.

In an exemplary embodiment, one or more compensators of the at least one compensator each have an annular structure extending around the border of the frame.

In this way, the compensators of an annular structure can not only separate the longitudinal borders from the leads, but also can separate the longitudinal borders from the iron core at the middle, thereby significantly reducing the circulating current of the whole window (comprising the iron core of the frame and border iron members of the frame), and preventing the circulating current from being transferred.

In an exemplary embodiment, the one or more compensators each comprise a first half and a second half connected to each other, there is a gap between the first half and the second half, and the cross sections, in a direction perpendicular to a vertical axis of the borders of the frame, of the one or more compensators are circular or rectangular.

In this way, the compensators are easy to mount, and can effectively avoid the occurrence of the problem of a large circulating current.

In an exemplary embodiment, the cross-sections are square.

In this way, the compensators have a suitable structure, are easy to manufacture and mount, and can effectively avoid the occurrence of the problem of a large circulating current.

In an exemplary embodiment, one or more compensators of the at least one compensator each have a structure extending only over a part of circumference of the border around the border of the frame.

In this way, in cases where the length of the compensator is ensured to be unchanged, the cost of the compensator can be reduced, while the occurrence of the problem of a large circulating current can also be avoided.

In an exemplary embodiment, the one or more compensators cover only one side of the borders of the frame close to the leads of the transformer.

In this way, in cases where the length of the compensator is ensured to be unchanged, the cost of the compensator can be reduced, while the occurrence of the problem of a large circulating current can also be avoided.

According to yet another aspect of the present invention, a transformer is provided, the transformer comprises a winding, a metal frame and leads located on one side of the frame and spaced apart from the frame, the frame comprising borders and an iron core located inside a window enclosed by the borders, the winding being provided around the iron core; in particular, the transformer further comprises a compensation structure for reducing circulating current in a window of a transformer as described above.

The present invention solves the problem of circulating current from a brand new perspective based on a magnetic field, and has the following advantages compared with the solutions adopted in the prior art:

1. The solution of a copper compensation ring in the prior art causes large losses on the copper compensation ring, and needs to occupy a part of space of the iron core, having a high overall cost; while the present invention has the advantages of small size, no additional losses, low overall costs and being convenient to mount.
2. The solution of the bypass cables or short-circuit copper bars in the prior art cannot be applied to all the circulating current nodes, and therefore cannot assure 100% to solve the problem; while the present invention can avoid the occurrence of the problem of a large circulating current from its physical principle.
3. The full insulation structure solution in the prior art is only applicable to a low induced voltage of the window; otherwise the circulating current may flow into the iron core and generate other risks; while the annular compensator solution of the present invention can reduce the circulating current of the whole window (comprising the iron cores of the frame and the border iron members of the frame), and can avoid the circulating current from being transferred.
4. In some cases, the structure of windings of even-numbered layers in the prior art needs to increase material costs of the solution greatly in order to meet parameters of customer requirements; while the present invention has little modification to the traditional main body structure, and requires low costs.
5. The special lead design in the prior art is only applicable to a 2/2 iron core, and a corresponding special design is required for structures such as an oil tank shielding; while the present invention has little modification to the traditional main body structure, and requires low costs.

BRIEF DESCRIPTION OF THE DRAWINGS

Drawings illustrated herein are used to provided further understanding of the present application and constitute a part of the present application; schematic embodiments and description thereof in the present application are used for explaining the present application, rather than limiting the present application improperly. In the drawings.

DETAILED DESCRIPTION OF THE EMBODIMENTS

Hereinafter, the technical solutions of the embodiments of the present invention will be described clearly and completely in connection with the drawings in the embodiments of the present invention. It is apparent that the described embodiments are merely some but not all embodiments of the present invention. The following description of at least one exemplary embodiment is merely illustrative in nature, and is in no way intended to limit the present invention, applications or uses thereof. All other embodiments obtained by a person of ordinary skill in the art based on the embodiments of the present invention without inventive efforts shall belong to the scope of protection of the present invention.

For clarity, only some of the components in the transformer are shown in FIGS. 1 to 6 of the present invention, while other components unrelated to the inventive concept of the present invention are not shown, to avoid confusion.

Figure 1:
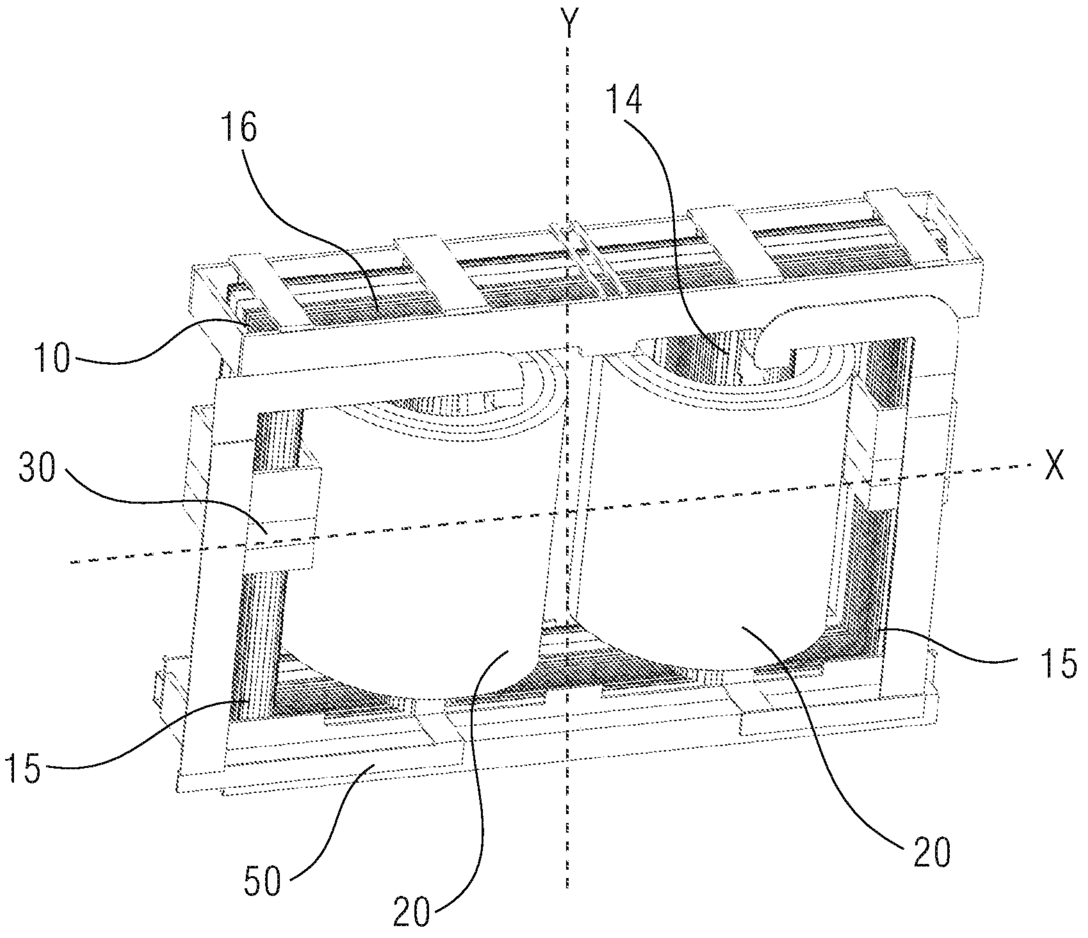
FIG. 1 is a schematic perspective assembly diagram of a transformer comprising a compensation structure for reducing circulating current in a window of a transformer according to a first embodiment of the present invention.

Refer to FIG. 1, a schematic perspective assembly diagram of a transformer comprising a compensation structure for reducing circulating current in a window of a transformer according to a first embodiment of the present invention is shown. In FIG. 1, the transformer comprises a metal frame 10 and two windings 20, wherein the frame 10 is made of, for example, silicon steel sheets, the frame 10 comprises borders and two iron cores 14 located inside a window, and each of the two windings 20 is provided around either of the two iron cores 14. It is to be illustrated that although in this embodiment, it is shown that there are two iron cores 14, the number of iron cores may vary depending on the type of the transformer.

In particular, the transformer further comprises a compensation structure for reducing circulating current in a window of a transformer. The compensation structure comprises two compensators 30 provided on borders of the frame 10, wherein the two compensators 30 are both made of silicon steel sheets of a magnetic material, and the two compensators 30 separate a part of the borders of the frame 10 from a part of leads 50.

Specifically, the four borders of the frame 10 are of a rectangular structure as a whole, and comprise two transverse borders 16 extending parallel to a longitudinal central axis X of the frame 10 and two longitudinal borders 15 extending parallel to a transverse central axis Y of the frame 10; the two longitudinal borders 15 are two side limbs provided at two sides of the iron cores 14. The two compensators 30 can be referred to as longitudinal compensators, and are each provided around a respective longitudinal border 15 along at least a length of the respective longitudinal border 15. The two compensators 30 are provided symmetrically relative to the transverse central axis Y of the frame 10. The two compensators 30 can be mounted to the longitudinal borders 15 in various ways; for example, the compensators can be connected by straps, or can be bonded by an adhesive, or can be mounted by clamps of an insulating structure, etc.

It should be noted that in the three embodiments shown in the present invention, the compensators are all longitudinal compensators provided on the longitudinal borders 15. However, it should be understood that all types of compensators shown in the present invention can also be provided on the transverse borders 16 of the frame 10, which may be referred to as transverse compensators. Transverse compensators are not shown in the drawings of the present invention, but one or more transverse compensators can be applied in a transformer depending on specific requirements.

By means of the two compensators 30, a part of the longitudinal borders 15 of the frame 10 are separated from a part of the leads 50, to increase the impedance between the window circuit of the frame 10 and the current circuit of the external leads 50, thereby significantly reducing an induced current within the frame 10 and avoiding harmful effects.

Figure 11:
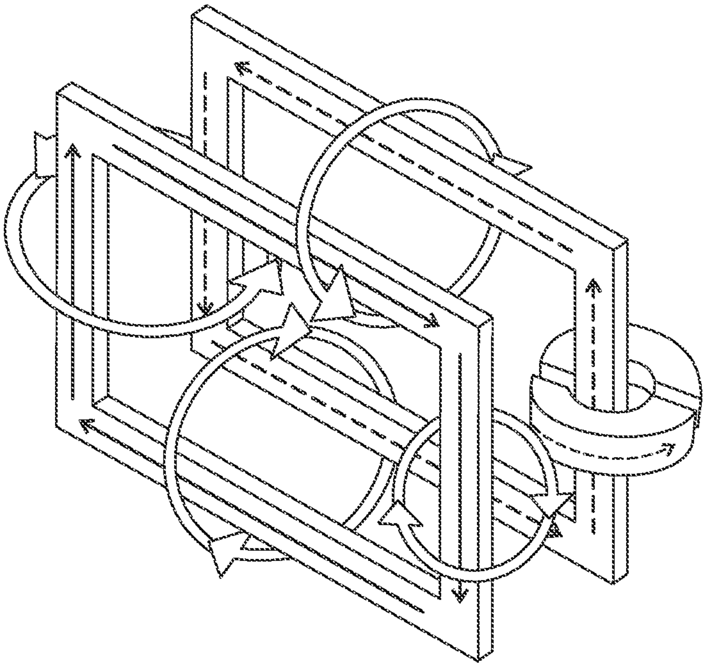
FIG. 11 is a schematic diagram showing the basic principle of the present invention.

FIG. 11 is a schematic diagram showing the basic principle of the present invention. It can be seen from FIG. 11 that an induced current will be generated between two iron structures (for example, the frame 10 made of silicon steel sheets and the leads 50 made of a metal material) between a high-voltage side and a low-voltage side, and the induced current within the frame 10 can be greatly reduced by the annular compensators 30 provided on the frame 10.

Figure 2:
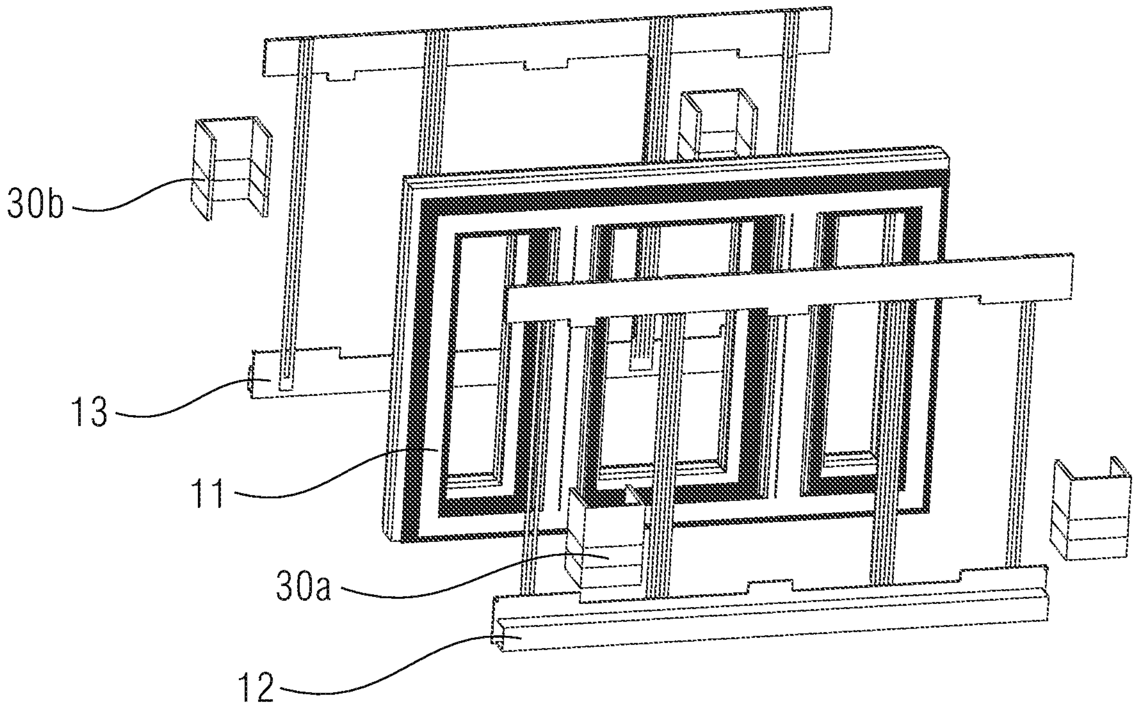
FIG. 2 is a schematic perspective disassembly diagram of the transformer comprising the compensation structure for reducing circulating current in a window of a transformer according to the first embodiment of the present invention.

Refer to FIG. 2, a schematic perspective disassembly diagram of the transformer comprising a compensation structure for reducing circulating current in a window of a transformer according to the first embodiment of the present invention is shown. From this figure, the specific structure of the transformer and the two compensators 30 thereof can be seen more clearly, wherein the transformer comprises an iron core circuit 11, a lead side circuit 12 and a non-lead side circuit 13. Each compensator 30 comprises a first half 30*a* and a second half 30*b* connected to each other, and the cross section, in a direction perpendicular to a vertical axis of the longitudinal borders 15, of each compensator 30 is rectangular. Of course, it can be conceived that each compensator 30 can have any shape suitable to surround the longitudinal border 15, such as circular, oval, square, polygon, etc. It should be noted that there is a gap between the first half 30*a* and the second half 30*b* to prevent an induced current from being generated by a main flux.

In addition, in the first embodiment shown in FIGS. 1 and 2, the first half 30*a* and the second half 30*b* each comprise three segments; however, it should be understood that according to specific application scenarios and design requirements, the first half 30*a* and the second half 30*b* can comprise other number of segments, and certainly can comprise only one segment.

In the first embodiment, the compensators 30 can not only separate a part of the longitudinal borders 15 from a part of the leads 50, but also can separate the longitudinal borders 15 from the iron cores 14, thereby significantly reducing the circulating current of the whole window (comprising the iron cores of the frame and border iron members of the frame), being able to prevent the circulating current from being transferred.

Figure 3:
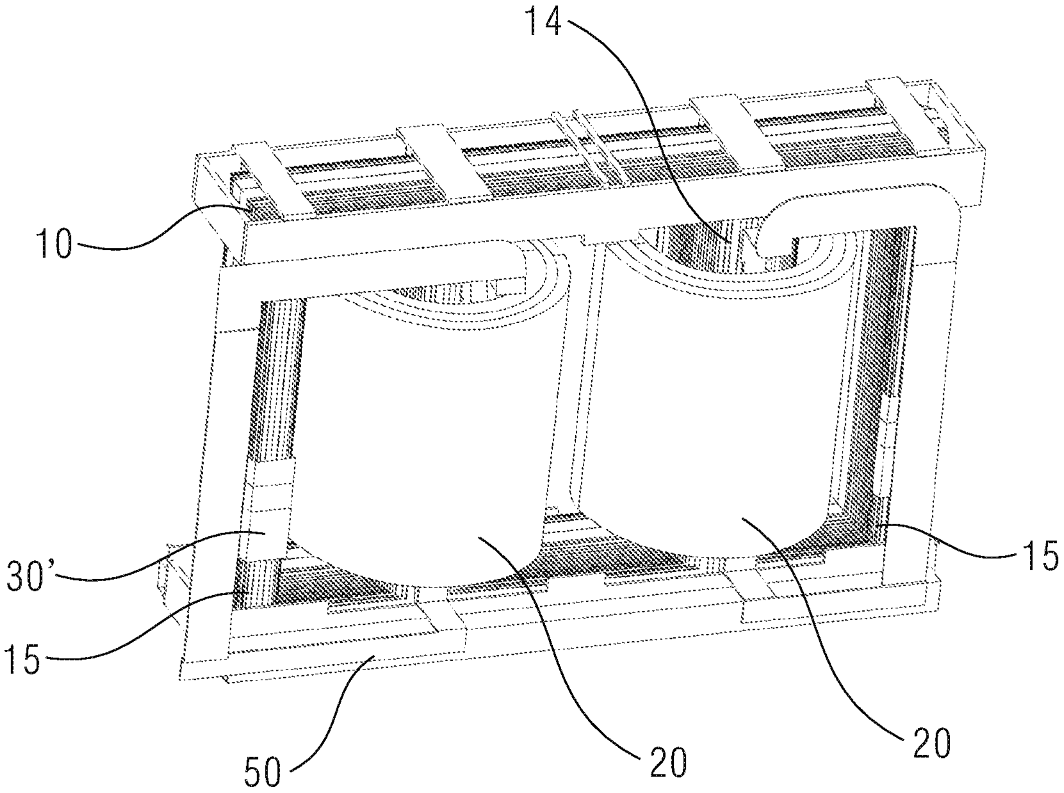
FIG. 3 is a schematic perspective assembly diagram of a transformer comprising a compensation structure for reducing circulating current in a window of a transformer according to a second embodiment of the present invention.
Figure 4:
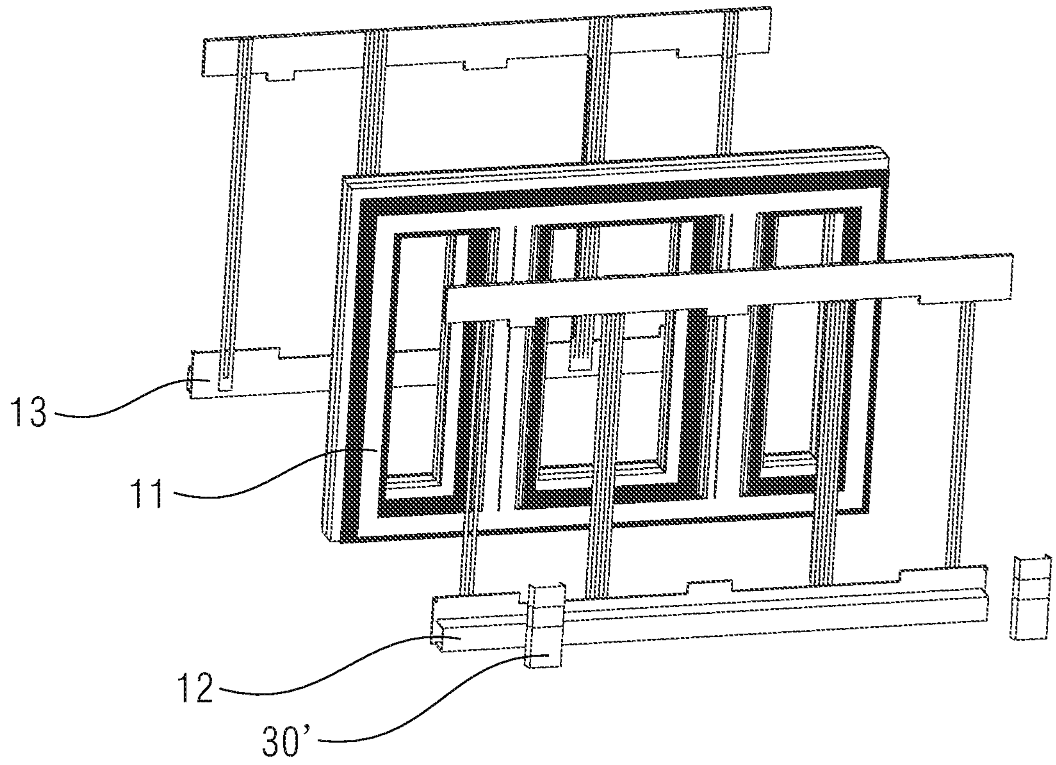
FIG. 4 is a schematic perspective disassembly diagram of the transformer comprising the compensation structure for reducing circulating current in a window of a transformer according to the second embodiment of the present invention.

Refer to FIGS. 3 and 4, a schematic perspective assembly diagram and a schematic perspective disassembly diagram of a transformer comprising a compensation structure for reducing circulating current in a window of a transformer according to a second embodiment of the present invention are shown. The transformer shown in FIGS. 3 and 4 is similar to the transformer shown in FIGS. 1 and 2, and the difference lies in that each of compensators 30' in FIGS. 3 and 4 mainly covers one side of the longitudinal border 15 of the frame 10 close to the leads 50 of the transformer. The compensators of this structure can be referred to as semi-annular compensators, and the other three sides of each of the longitudinal borders 15 are substantially not covered by the compensator 30'.

The semi-annular compensators 30' in the second embodiment are mainly used to separate the longitudinal borders 15 from the leads 50, so as to increase the impedance between the window circuit of the frame and the current circuit of external leads, and reduce the induced currents at the lead sides. Compared with the annular compensators 30 in the first embodiment, the semi-annular compensators 30' can reduce costs while also avoiding the occurrence of the problem of a large circulating current.

Figure 5:
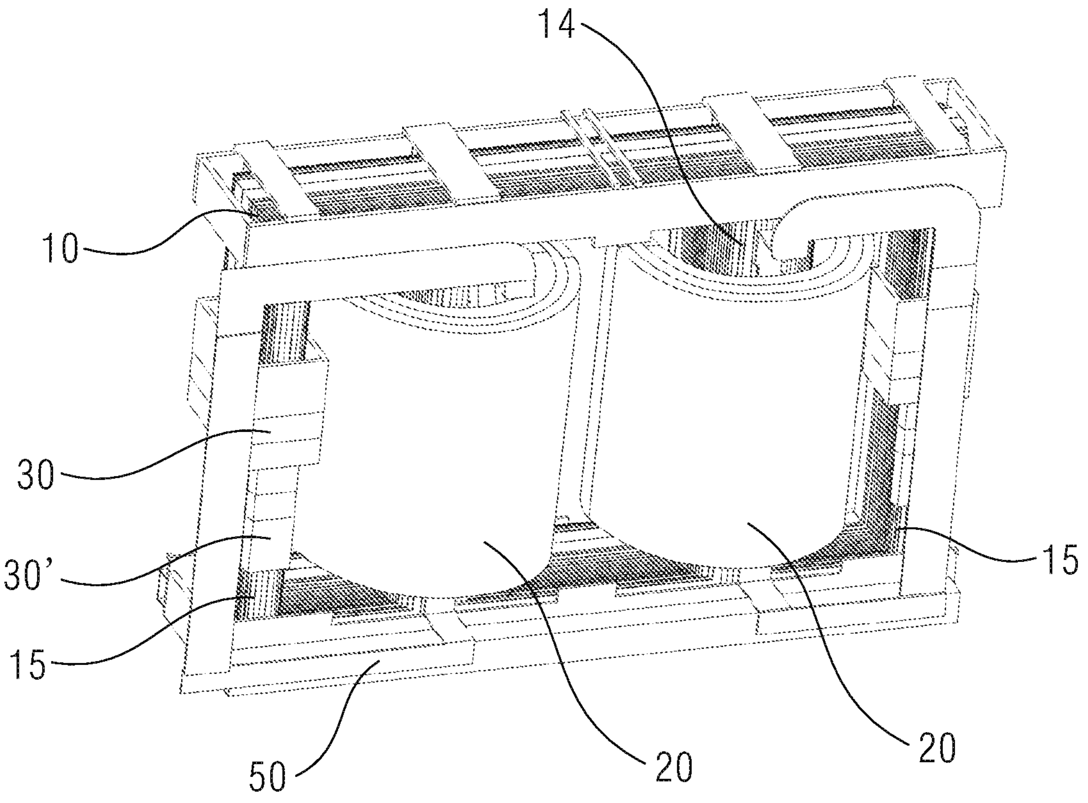
FIG. 5 is a schematic perspective assembly diagram of a transformer comprising a compensation structure for reducing circulating current in a window of a transformer according to a third embodiment of the present invention.
Figure 6:
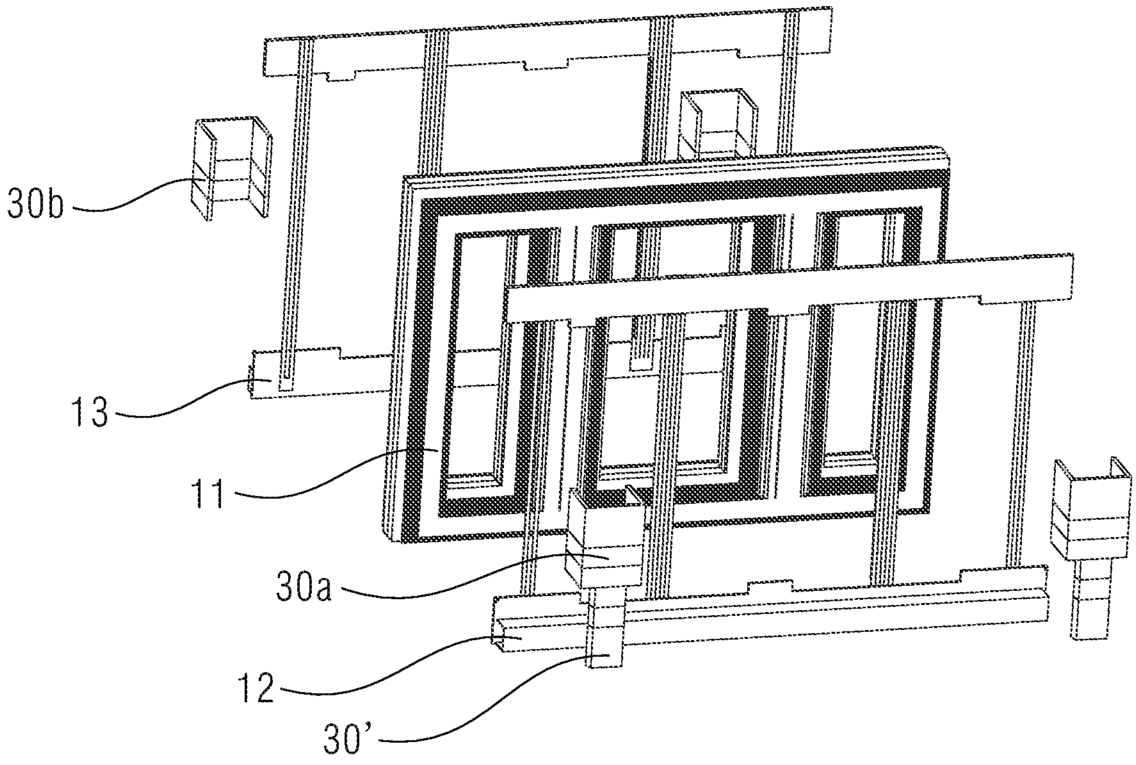
FIG. 6 is a schematic perspective disassembly diagram of the transformer comprising a compensation structure for reducing circulating current in a window of a transformer according to the third embodiment of the present invention.

Refer to FIGS. 5 and 6, a schematic perspective assembly diagram and a schematic perspective disassembly diagram of a transformer comprising a compensation structure for reducing circulating current in a window of a transformer according to a third embodiment of the present invention are shown. The transformer shown in FIGS. 5 and 6 is similar to the transformer shown in FIGS. 1 and 2, and the difference lies in that the compensators in FIGS. 5 and 6 include both the annular compensator 30 in FIG. 1 and the semi-annular compensator 30' in FIG. 3. The use of a combination of the annular compensator 30 and the semi-annular compensator 30' effectively avoids the occurrence of the problem of a large circulating current.

Figure 7:
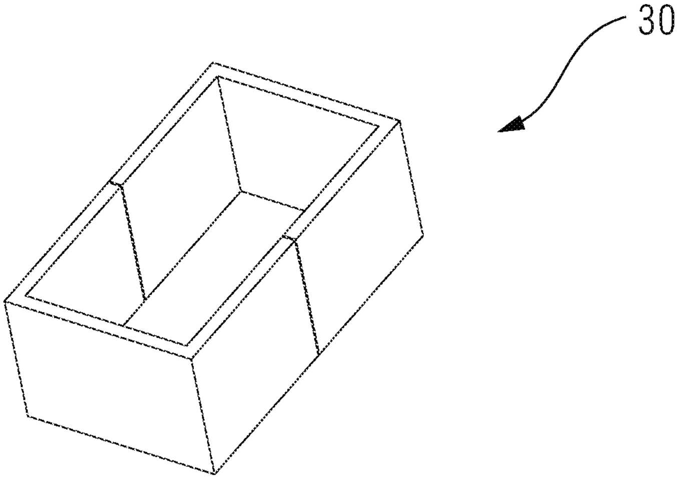
FIG. 7 is a schematic diagram of a compensator according to the first embodiment of the present invention.
Figure 8:
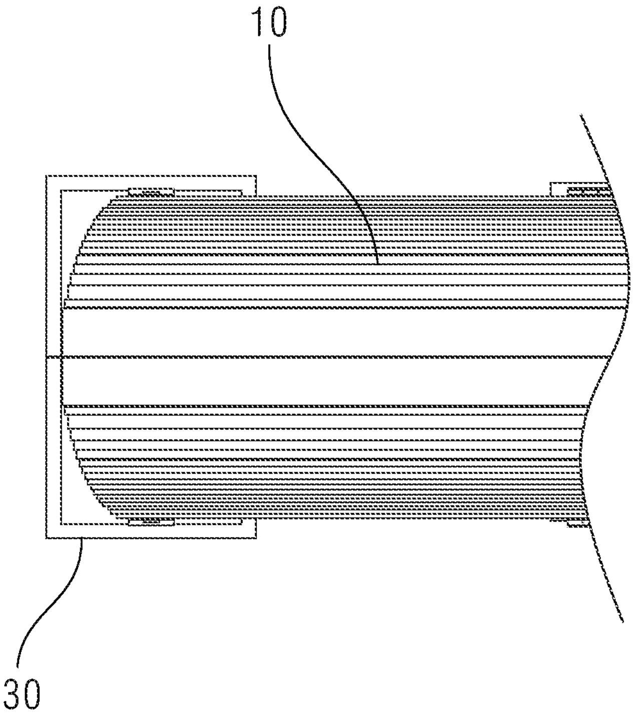
FIG. 8 is a schematic partial top view when the compensator according to the first embodiment of the invention is mounted on a transformer.
Figure 9:
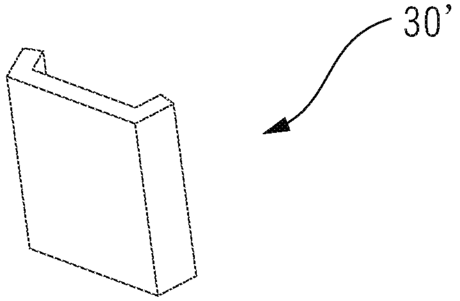
FIG. 9 is a schematic diagram of a compensator according to the second embodiment of the present invention.
Figure 10:
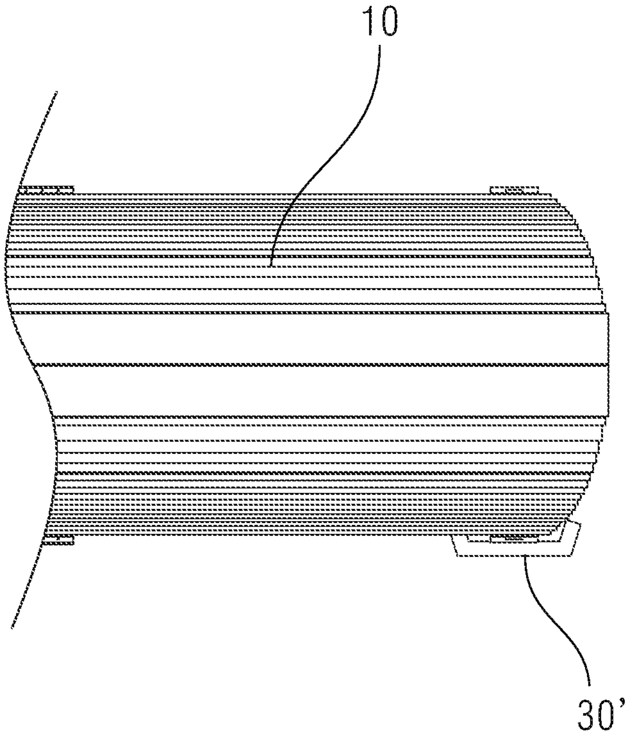
FIG. 10 is a schematic partial top view when the compensator according to the second embodiment of the invention is mounted on a transformer.

Refer to FIGS. 7 and 8, a perspective view of an annular compensator 30 and a schematic partial top view when said compensator 30 is mounted on the frame 10 of a transformer are shown. Refer to FIGS. 9 and 10, a perspective view of a semi-annular compensator 30' and a schematic partial top view when said compensator 30' is mounted on the frame 10 of a transformer are shown.

The compensation structures for reducing circulating current in a window of a transformer in the first to third embodiments of the present invention can separate iron structures between a high-voltage side and a low-voltage side of the transformer, and increase the impedance between the window circuit of the frame and the current circuit of external leads, thereby significantly reducing the induced current within the frame and avoiding harmful effects.

It should be noted that the terminologies used in the description are for the purpose of describing particular embodiments only and are not intended to limit the exemplary embodiments according to the present application. As used herein, the singular form is intended to include the plural form as well, unless the context clearly indicates otherwise, and further it is to be understood that the terms "comprises" and/or "comprising" when used in this description, specify the presence of features, steps, operations, devices, components, and/or combinations thereof.

It should be understood that for convenience of description, the dimensions of the parts shown in the drawings are not drawn according to the actual proportional relationships. Techniques, methods, and devices known to a person of ordinary skill in the relevant art may not be discussed in detail, but should be considered as a part of the description where appropriate. In all examples shown and discussed herein, any specific values should be construed as exemplary only and not as limiting. Therefore, other examples of the exemplary embodiments may have different values.

The contents above are merely embodiments of the present application. It should be pointed out that a person of ordinary skill in the art may make further improvements and modifications without departing from the principle of the present application, and these improvements and modifications shall also belong to the scope of protection of the present application.

LIST OF REFERENCE NUMERALS

10: frame;
11: iron core circuit;
12: lead side circuit;
13: non-lead side circuit;

14: iron core;
15: longitudinal border;
16: transverse border;
20: winding;
30, 30': compensator;
30*a*: first half;
30*b*: second half;
X: longitudinal central axis;
Y: transverse central axis;
50: leads.

What is claimed is:

1. A compensation structure for reducing circulating current in a window of a transformer, the transformer comprising a winding, a metal frame and leads located at one side of the frame and spaced apart from the frame, the frame comprising borders and an iron core located inside a window enclosed by the borders, the winding being provided around the iron core, wherein the compensation structure comprises:

at least one compensator provided on the borders of the frame, wherein the at least one compensator is made of silicon steel sheets of a magnetic material, wherein the at least one compensator separates at least a part of the borders the frame from a part of the leads, wherein one or more compensators in the at least one compensator each have an annular structure extending around the border of the frame, and wherein the one or more compensators each comprise a first half and a second half connected to each other, wherein there is a gap between the first half and the second half, and the cross-sections, in a direction perpendicular to a vertical axis of the borders of the frame, of the one or more compensators are circular or rectangular.

2. The compensation structure for reducing circulating current in a window of a transformer according to claim 1, wherein the borders of the frame include two transverse borders and two longitudinal borders, and wherein the at least one compensator comprises: two transverse compensators, one at either of the two transverse borders; and/or two longitudinal compensators, one at either of the two longitudinal borders.

3. The compensation structure for reducing circulating current in a window of a transformer according to claim 2, wherein the two transverse compensators are provided symmetrically relative to a longitudinal central axis of the frame, and/or wherein the two longitudinal compensators are provided symmetrically relative to a transverse central axis of the frame.

4. The compensation structure for reducing circulating current in a window of a transformer according to claim 3, wherein the at least one compensator comprises the two longitudinal compensators, wherein the two longitudinal borders are two side limbs each provided at either side of the iron core, and the two longitudinal compensators are each provided around a respective side limb along at least a length of the respective side limb.

5. The compensation structure for reducing circulating current in a window of a transformer according to claim 1, wherein the cross sections are square.

6. The compensation structure for reducing circulating current in a window of a transformer according to claim 1, wherein one or more compensators in the at least one compensator each have a structure extending only over a part of circumference of the border around the border of the frame.

7. The compensation structure for reducing circulating current in a window of a transformer according to claim 6, wherein the one or more compensators only cover one side of the borders of the frame close to the leads of the transformer.

8. A transformer, comprising:

the winding, the metal frame, and leads located at one side of the frame and spaced apart from the frame, wherein the frame comprises borders and the iron core located inside the window enclosed by the borders, wherein the winding is provided around the iron core, wherein the transformer further comprises the compensation structure for reducing circulating current in a window of the transformer according to claim 1.

* * * * *